July 21, 1936.  J. HELENBERG  2,048,550
PRESSURE ACTUATED TRIP VALVE
Filed March 29, 1935   3 Sheets-Sheet 1
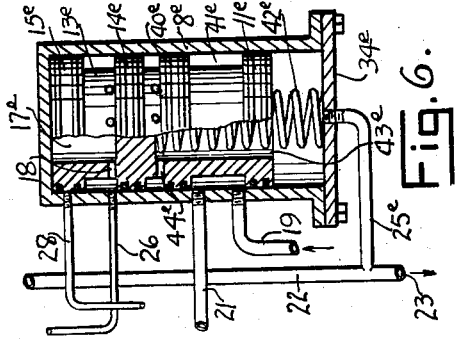
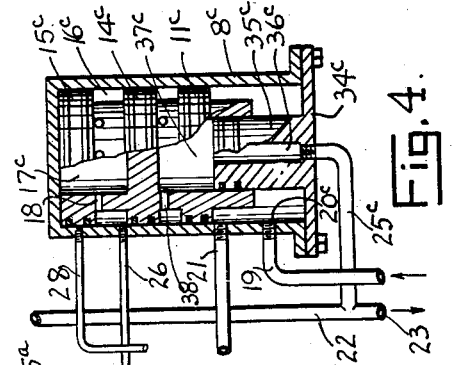
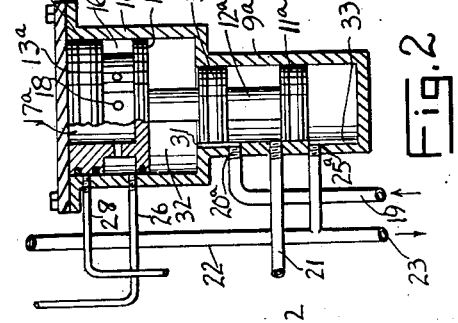
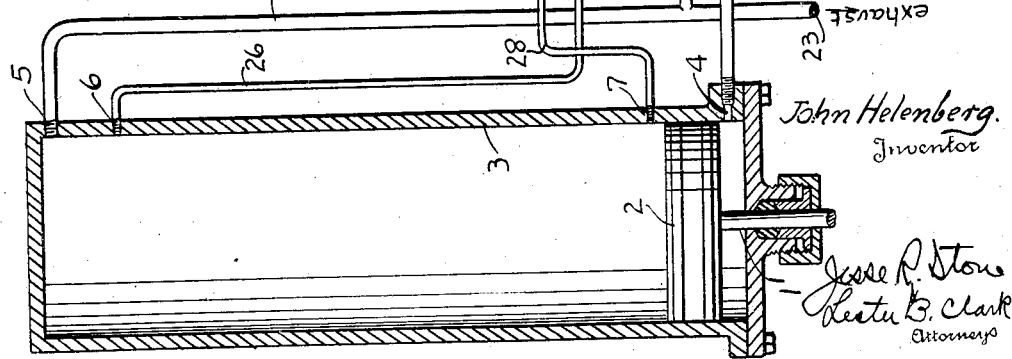

July 21, 1936. J. HELENBERG 2,048,550
PRESSURE ACTUATED TRIP VALVE
Filed March 29, 1935 3 Sheets-Sheet 2
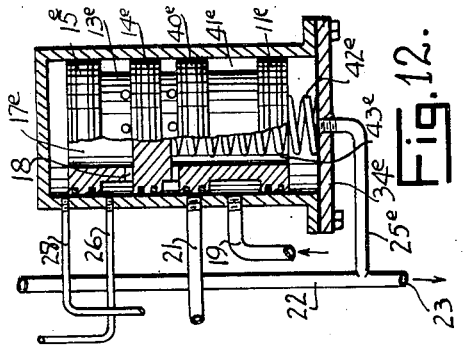
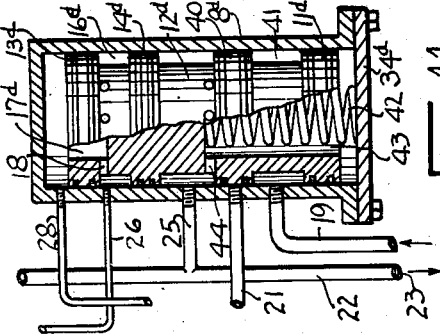
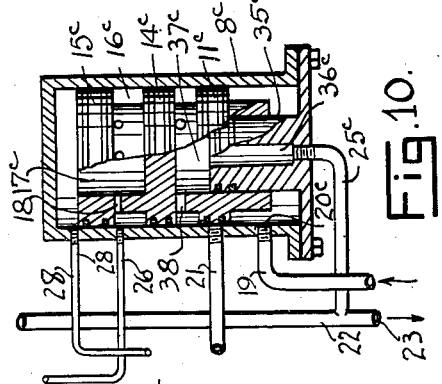
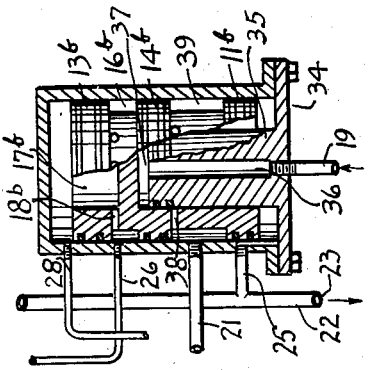
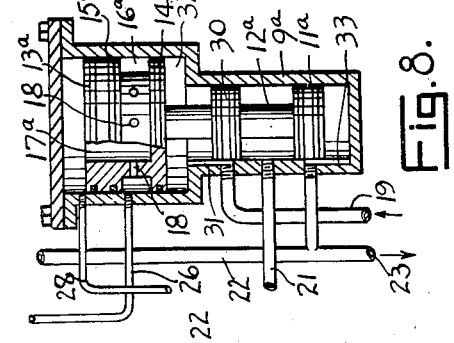
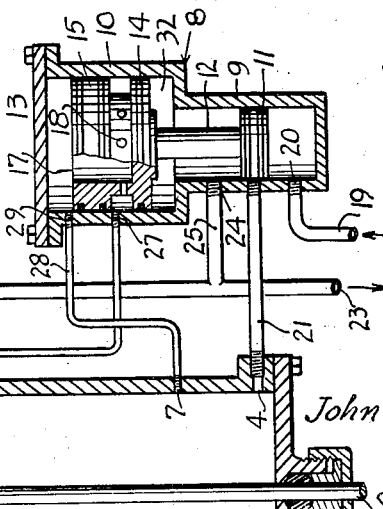
John Helenberg
Inventor
Jesse R. Stone
Lester D. Clark
Attorneys July 21, 1936.  J. HELENBERG  2,048,550
PRESSURE ACTUATED TRIP VALVE
Filed March 29, 1935  3 Sheets-Sheet 3
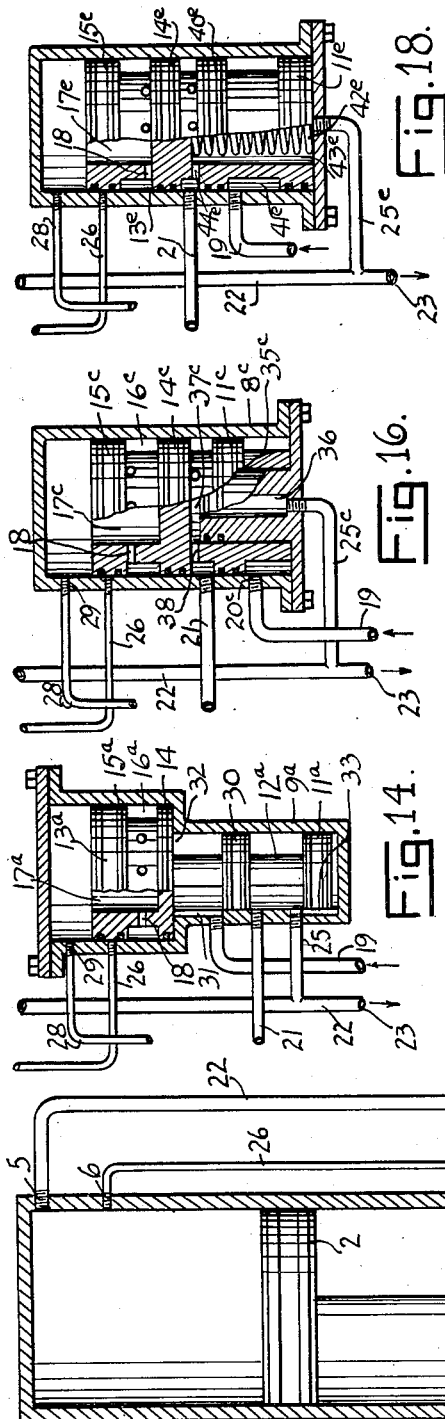
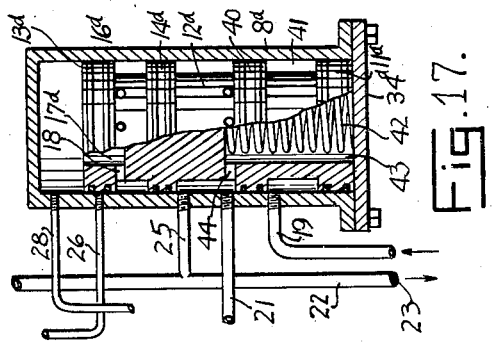
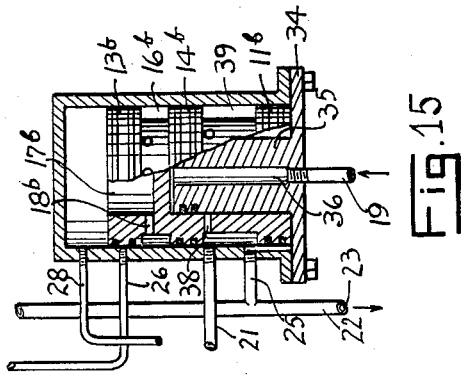
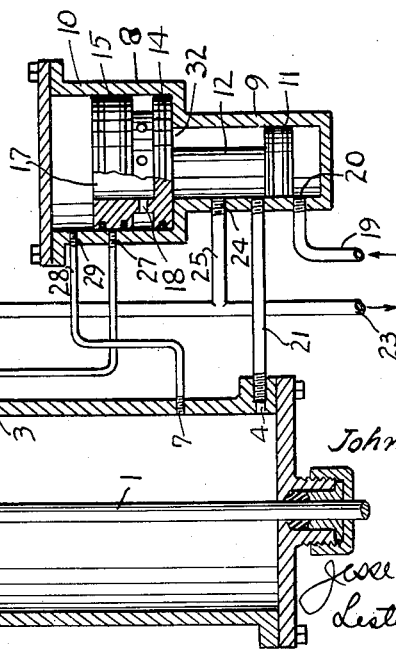
John Helenberg.
Inventor Patented July 21, 1936

2,048,550

UNITED STATES PATENT OFFICE 2,048,550

PRESSURE ACTUATED TRIP VALVE

John Helenberg, Houston, Tex.

Application March 29, 1935, Serial No. 13,597

13 Claims. (Cl. 121—150)

This invention relates to trip valves or slide valves which control the admission of pressure fluid to and from a cylinder to actuate a piston therein.

The invention is particularly adapted for use in raising a load by the fluid pressure on the piston and which load acts to return the piston to the lower end of its stroke. It is adapted particularly for use in pumping or other operations where a load is to be reciprocated. I desire to provide a trip valve which will automatically operate in the operation of the piston so as to control the entrance of the fluid to and from the cylinder at the proper time in the cycle of operations of the piston.

I desire to provide an efficient type of valve which is responsive to the pressures of fluid employed in operating the pump, so that the entrance of the pressure fluid to the cylinder is controlled as desired.

This operation of controlling the entrance of the pressure fluid to the cylinder is capable of various embodiments and in the drawings herewith some of the preferred forms of the invention are set out.

Referring to the drawings, Fig. 1 is a central longitudinal section through a cylinder with a piston operating therein, fluid connections being made with my improved form of trip valve.

Fig. 2 is a vertical longitudinal section through a slightly different embodiment of the trip valve.

Figs. 3, 4, 5, and 6 are similar longitudinal sections through other forms of the trip valve, which may be employed in the place of the form shown in Fig. 1.

Fig. 7 is a sectional assembly view similar to that shown in Fig. 1, illustrating the parts as shown in Fig. 1, but with the valve and piston in different position.

Figs. 8 to 12, inclusive, are central longitudinal sections through the valves shown in Figs. 2 to 6, inclusive, with the valves in position different from that shown in Figs. 2 to 6.

Fig. 13 is another view similar to Fig. 1 showing the trip valve and operating piston both in a still different position.

Figs. 14 to 18 are figures illustrating the same valve shown in Figs. 2 to 6, inclusive, but with the trip valve in a still different position.

It will be seen from the drawings that I have shown six separate embodiments of the invention. In sheet 1 of the drawings there are six forms of trip valve, each of which is shown in its initial position. In sheet 2 the same valves are shown in the same sequence in a second position and in sheet 3 the same six valves are shown in the same sequence in a third position.

In considering a construction with which my invention is adapted to be used, it may be understood as being employed with a pumping apparatus in which the rod 1 may be understood as being connected with the sucker rod which operates the piston in the well. I have shown the upper end of this rod 1 as connected with a piston 2, which is a power piston and operates within a cylinder 3, which is closed except for a series of lateral ports. There is an inlet port 4 for the power fluid under pressure, this port being at the lower end of the cylinder. There is an exhaust port 5, which is connected with the cylinder at the upper end thereof to allow the exhaust of pressure fluid at the proper time. There are two intermediate ports, one toward the upper end shown at 6, and one toward the lower end shown at 7. These ports are employed in the operation of my trip valve as will be later explained. It is understood further in the operation of the device that the pressure fluid introduced below the piston operates only to raise the load of the pump rod and plunger and that the said weight of the pump rod and plunger acts to return the piston 2 from the upper end of the cylinder to the lower end thereof.

A preferred form of trip valve employed in controlling the entrance of pressure fluid to the cylinder 3 at the proper time is shown in Fig. 1 as being connected thereto by a series of pipes. This valve is mounted within a housing 8, which is of reduced diameter on the lower portion 9 and of larger diameter at the upper portion 10. Within the lower reduced portion is a piston valve 11, which is connected by a valve rod 12 to the valve head 13. Said valve head 13 has two enlargements thereon, the lower enlargement 14 being separated from the upper enlargement 15 by an annular groove or space 16.

The space 16 is connected with an interior chamber 17 in the upper valve piston 13 by means of a series of passages 18. It will thus be seen that fluid entering into the annular chamber 16 may find communication through the port 18 with the interior chamber 17.

The pressure fluid coming from the source of supply, as for example, a steam boiler, may enter the valve housing 9 through a conducting pipe 19 leading to the inlet port 20. It may pass from the interior of the valve housing 9 through an outlet port having a pipe 21 connected therein. The pipe 21 is shown as being connected to the port 4 at the lower end of the power cylinder.

The exhaust from the port 5 in the power cylinder is through a pipe 22 to the atmosphere or other outlet indicated at 23 in the drawings. The interior of the reduced portion 9 of the valve housing above the piston valve 11 may have an outlet to the exhaust through the port 24, and branch pipe 25. The port 6 in the power cylinder has connection through a pipe 26 with the valve housing through the port 27 to the annular chamber 16, and the port 7 at the lower end of the power cylinder is connected through the pipe 28 to the upper portion of the valve housing 10 through the port 29.

With the parts of the assembly in the position shown in Fig. 1, steam or other pressure fluid from a source of supply may enter through the pipe 19 and the port 20 below the lower end of the piston valve 11. It will be seen that the upper end of the piston is open to the exhaust and that the space above the trip valve at 17 is also open to the exhaust through the pipe 26 to the cylinder 3 and out through the exhaust 22. When the pressure fluid enters below the piston 2 the said piston will be moved upwardly and will continue its movement with its valve parts in the position shown in Fig. 1 until the piston 2 has passed the port 6. At that point the pressure fluid below the piston 2 may pass outwardly through the port 6, the pipe 26, to the interior of the valve cylinder and into the space above the upper enlargement 15. This will exert a pressure at the upper end of the valve assembly greater than the pressure below the same, due to the greater area in the upper portion 10 of the cylinder.

The valve will then be started on its downward movement to close off the inlet of further pressure fluid through the pipe 21 as shown in Fig. 7. The piston 2 will thus be relieved of the pressure of the steam below it and will be moved on its downward stroke through the pull of the load of the pump rod. On its downward movement the fluid remaining in the cylinder 3 and below the piston will be forced outwardly as the piston is pulled downwardly by the load through the port 7 and the pipe 28 above the piston, the inlet port 29 to the valve housing then being open, as seen in Fig. 7, and this pressure fluid will move the valve to its lowest position shown in Fig. 13. With the valve ports in the position shown in Fig. 13 it will be noted that the space below the piston 2 in the power cylinder will be open through the pipe 21, the valve housing 9, and the pipe 25 to the exhaust pipe 22. It will be noted that the size of the pipe 25, which allows the exhaust of the fluid below the power piston 2 may be regulated to allow the pump piston 2 to drop at the desired rate of speed so that there may be no shock on the mechanism due to the falling of the load on the piston. The valve 12 will be held in lower position during the descent of the piston 2 by the entrance of the fluid above the valve through the pipe 28, as previously noted. The parts will continue in this position until the power piston 2 has passed into its lowermost position shown in Fig. 1.

As the piston passes the port 7 the entrance of pressure fluid above the valve will be shut off and the outlet of the fluid above the valve will be open to the exhaust through the pipe 28, the port 7, and the exhaust 22 at the upper end of the cylinder 3. The pressure fluid at the lower end of the valve piston 11 will be then great enough to force the valve piston to its upper position shown in Fig. 1 ready for another cycle of operations.

It will thus be noted that the valve is automatically moved to control the entrance of pressure fluid below the power piston 2 to carry it to the upper end of its stroke, the pressure fluid then being cut off from the cylinder 3, so as to allow the piston to drop due to the weight of the pump rods and plunger. When the power piston has reached the lower end of its stroke the valve will have automatically assumed a position to allow the entrance of pressure fluid below the power piston to start a new cycle of operations. It will be seen that my device is particularly adaptable for use in pumping operations, taking the place of the ordinary pumping unit. The length of the cylinder 3 can be such as to accommodate the required length of the stroke of the pump and can be varied in accordance with the particular installation which is to be used. In the use of my valve the device will operate smoothly and automatically without more than ordinary attention.

In the remaining five figures on each of the three sheets of drawings I have shown three separate positions of five other and different forms of trip valve which may be employed to perform the functions of the one just described.

Referring now particularly to the modification shown in Figs. 2, 8, and 14, it will be understood that the connecting pipes are numbered in the same manner as they are numbered in Figs. 1, 7, and 13, that is, the exhaust pipe 22 in Fig. 2 has the same connections as the exhaust pipe 22 in Fig. 1. This numbering of the connecting pipes is adopted for purposes of clearness although the ports to which these pipes lead in the trip valve are slightly different in each of the modifications. Their connection with the power cylinder 3 is, however, identical. In Fig. 2, the valve housing 9a and 10a correspond closely with the parts 9 and 10 of the Fig. 1 embodiment. Within the reduced portion 9a of the cylinder I have shown two separate enlargements upon the valve stem 12a to control the flow of the pressure fluid. The lower valve is numbered 11a, the upper one of the same diameter is shown at 30. In the upper portion 10a of the valve housing is a head similar in all respects to that shown in Fig. 1, being the upper enlargement 15a and a lower enlargement 14a. The annular chamber 16a and the interior chamber 17a are the same as those shown in Fig. 1.

The connections of the pressure fluid conducting pipes have been somewhat differently arranged. The inlet pipe 19 is connected to a port 20a in the lower portion of the valve cylinder 10a and toward the upper end of said reduced portion. This inlet port 20a connects with a longitudinal groove 31 in the side of the valve housing which has constant communication with the space 32 below the upper head 13a of the valve. The pipe 21 which conducts the pressure fluid to the power cylinder is connected with an outlet port midway of the lower reduced portion 9a of the valve housing. The exhaust pipe 25a on the valve housing is connected with the exhaust pipe 22 as before. On the interior this exhaust port connects with a groove 33 in the side of the valve housing which gives a constant communication with the space below the valve piston 11a. The two pipes 28 and 26 are connected with the upper portion of the valve housing in the same manner as in the first embodiment.

In the operation of the second trip valve the pressure fluid enters through the pipe 19 to the valve housing, may pass into the space 32 below the upper valve head 13a and may also pass out through the pipe 21 below the power piston. The pressure of the fluid below the valve head will hold the valve in the Fig. 2 position while the power piston 2 is on its upward stroke. At the upper end of its stroke, however, the pressure fluid below the power piston 2 may pass out through the pipe 26 to the chamber 17a above the valve head and because of the increased area of the upper head of the valve the valve will be moved downwardly to the position shown in Fig. 8, which will cut off further supply of the pressure fluid below the piston. The valve will next assume the position shown in Fig. 14, and it will be seen that the fluid in the cylinder 3 below the piston will be forced outwardly during the descent of the load through the pipe 21 to the exhaust. It may also pass through the pipe 28 to the space above the upper valve head 13a and by preponderance of pressure move the valve into position closing off the entrance of pressure fluid to the cylinder 3 until the piston 2 has again reached the lower end of its stroke after which the fluid above the valve may exhaust through the pipe 28 to the upper end of the cylinder 3 and out through the exhaust pipe 22 and the pressure fluid below the valve will move it back to its uppermost position, the cycle of operations having thus been completed.

Referring to the modification shown in Figs. 3, 9, and 15: I have again numbered the connecting pipes with the same numbers employed in the Fig. 1 embodiment so that their connection with the power cylinder may be best understood. The inlet pipe for the pressure fluid entering the lower end of the valve housing is numbered 19 as before. The exhaust pipe 22 is connected into the valve housing toward the lower end thereof through the branch pipe 25. The pipe 21 leading to the lower end of the power cylinder is connected with the valve housing at a point spaced above the pipe 25. The pipes 26 and 28 are connected with the valve housing in approximately the same position as shown in the first two embodiments.

The valve housing in the Fig. 3 embodiment is practically cylindrical. The lower end of the cylinder is closed by a plate 34 having a central cylindrical projection 35 thereon, which acts as a stationary piston valve. The inlet of pressure fluid from the tube 19 is upwardly through the stationary piston 35 through the axial channel 36.

The moving portion of the valve in this embodiment is of uniform diameter except for a lower enlargement 11b and upper enlargement 14b and a third enlargement 13b at the upper extremity of the valve. The upper end of the valve has a chamber 17b therein connected by ports 18b to the annular chamber 16b as in the other embodiment.

The lower portion of the valve member is formed with a cylindrical chamber 37 to slide over the upper end of the stationary piston 35. There are lateral ports 38 in this chamber 37 connecting with an annular channel 39 between the two enlargements 11b and 14b.

In the operation of this device the parts are shown in their initial position in Fig. 3 where the pressure fluid entering through the pipe 19 is delivered into the chamber 37 and out through the port 38, chamber 39, and the pipe 21 to the power cylinder as before. When the power piston 2 reaches the upper end of its stroke as in the previous embodiments, the pressure fluid below the piston will enter the valve housing through the pipe 26 above the valve and by preponderance of pressure will start it downwardly, closing off the port 38 by means of the stationary piston 36 so that pressure fluid will no longer enter the power cylinder. The fluid below the piston will enter above the valve through the pipe 28, as in the other embodiments, holding the valve in position closing the inlet port for the pressure fluid, as shown in Fig. 9. As the power piston reaches the lower end of its stroke, as shown in Fig. 1, fluid above the valve piston will be open to the exhaust and the pressure of the fluid entering through the pipe 19 wil force the valve to its upper position shown in Fig. 3.

Referring now to the embodiment shown in Figs. 4, 10, and 16: In this embodiment the pressure fluid will enter through the pipe 19 to a port 20c in the valve cylinder. The exhaust pipe 22 will be connected through the pipe 25c to the lower plate 34c of the valve housing. The fluid pressure pipe 21 from the valve housing is connected to said housing at a point spaced above the port 20c. The pipes 26 and 78 are connected with the valve housing as in the previous embodiments.

The valve housing 8c is similar to that shown in Fig. 3 being generally cylindrical and closed at its lower end by the plate 34c which has a stationary piston 35c extending upwardly therefrom. Said piston has an axial passage 36c which conducts pressure fluid to a chamber 37c on the interior of the valve. The construction of the valve itself is quite similar to that shown in the Fig. 3 embodiment except that the lower enlargement 11c is spaced slightly upwardly from the lower end of the valve, so as to provide a passage around the valve from the lower portion of the housing to the pipe 21 when the valve is in its initial position.

When this device is operated the pressure fluid will enter through the pipe 19 and will have free outlet through the pipe 21 to the power cylinder. The valve will thus retain this initial position until the power piston 2 reaches the upper end of the cylinder 3 whereby the same sequence of operations will take place as in the previous embodiments.

The entrance of fluid under compression from below the piston through the pipe 26 will start the valve on its downward movement, closing off the entrance of further pressure fluid to the power cylinder, and when the valve is then opened to the entrance of fluid from below the piston through the pipe 28 it will be moved downwardly into the position shown in Fig. 16, and the pressure fluid above the valve will exhaust and allow the pressure fluid through the pipe 19 to move the valve back to its upper position, completing the cycle of operations.

In the embodiment of the trip valve shown in Figs. 5, 11, and 17, the same operations can be carried out. In this embodiment, the valve housing 8d is similar to that shown in Figs. 3 and 4. It is of cylindrical shape, and the lower end being closed by a plate 34d. The valve itself has four separate enlargements or pistons thereon. The lower one, 11d, is similar to that shown in Fig. 3, and the upper two enlargements, 13d and 14d, are also similar to those shown in Fig. 3. There is an intermediate enlargement on the valve indicated at 40.

The inlet for the pressure fluid is through the pipe 19 to the space 41 between the enlargements 11d and 40. Into this space when the valve is in its upper position, is connected the pipe 21 leading to the power cylinder. The exhaust pipe 22 is connected through the pipe 25 to the valve housing at a point initially above the enlargement 40, and below the enlargement 14d. The upper end of the housing is formed and connected with the pipes 26 and 28, as in the previous embodiments. The valve in this embodiment is held normally in raised position by means of a spring 42. Said spring bears at its lower end upon the plate 34d, and, at its upper end, against the upper wall of the recess 43 in the lower end of the valve. From this recess 43, passages 44, extending radially therefrom, connect with the space between the two enlargements 40 and 14d.

In this embodiment the parts will be held normally raised by the spring 42, and in this position the pressure fluid entering through the pipe 19 will find an outlet through the pipe 21 to the power cylinder, as will be readily understood from Fig. 5. The space below the piston will be connected with the exhaust through the ports 44 and pipe 25; the connections at the upper end of the housing will be the same as in the previous embodiments. Thus the valve will tend to remain in its raised position until the power piston 2 reaches the upper end of the stroke when the pressure fluid below the piston will pass out through the pipe 26 and into the chamber 17d above the piston and force the piston downwardly against the pressure of the spring 42. As it moves downwardly the passage of pressure fluid through the pipe 21 will be closed off and the parts will again assume the position shown in Fig. 11. The fluid compressed by the piston 2 on its downward stroke entering above the valve will tend to force it to the lower end of its stroke, as seen in Fig. 17, but when the piston 2 has reached its lower limit the fluid will be free to exhaust from above the valve, allowing the spring to force the valve backwardly to its original position, again opening up the entrance of pressure fluid to the cylinder and initiating a second cycle of operations.

In the embodiment shown in Figs. 6, 12, and 18, I have shown a construction somewhat similar to that shown in Figs. 5, 11, and 17. The valve housing 8e is cylindrical in shape. It is closed at its lower end by the plate 34e and the piston 13e is held elevated by means of a spring 42e, in a manner similar to the embodiment just described. There are four enlargements upon the piston, viz., 11e, 40e, 14e, and 15e. The enlargements are spaced apart upon the piston so as to bring the same into the proper relation with the ports in the valve housing. The inlet for the pressure fluid through the pipe 19 connects with the space 41e, and the chamber 43e below the valve is connected by ports 44e to the space between the enlargements 14e and 40e. In this embodiment also the upper end of the valve is formed and connected with the pipes 28 and 26 as in each of the previous embodiments.

The pipe 21 conducting the pressure fluid to the power cylinder is also mounted in a position similar to that shown in Fig. 7. The exhaust pipe 22 is, however, connected by the branch 25e to a point at the lower end of the valve housing.

The spring 42e normally holds this valve in its upper initial position. In that position the course of pressure fluid is through the pipe 19, the chamber 41e, and the pipe 21 to the power cylinder. The space below the valve is open to the exhaust and the connections of the pipe 28 and 26 are as in the other embodiments. When the valve has reached the upper end of its stroke, allowing the pressure fluid to pass out through the pipe 26 to the chamber 17e above the valve the pressure will be sufficient to compress the spring and move the valve downwardly into the position shown in Fig. 12, thus closing off further passage of pressure fluid through the pipe 21 to the power cylinder. The power piston will then start on its downward stroke and the fluid below the piston will enter above the valve and move the piston further downward into its Fig. 18 position. In this position the pipe 21 is open to the exhaust through the passages 44e to the chamber 43e, and pressure fluid is still cut off from its passage to the power cylinder. When the piston has reached the lower end of its stroke, however, the fluid above the valve will find an outlet to the exhaust as in the previous embodiments and the pressure of the spring will be sufficient to move the valve again to its initial position shown in Fig. 6.

It will be seen that in all of the embodiments of my trip valve the connections of the control pipes 28 and 26 with the valve are practically identical, the changes being made largely in the control of the exhaust and the inlet of the pressure fluid. In each of these the control valve is automatic, making it possible by the use of any of these types of valve to control the operation of the pump in a simple and economical manner, assuring a positive control of the pressure fluid.

The descent of the power piston in the cylinder may be controlled by the size of the pipe 25. The fluid below the piston 2 exerts a pressure above the valve through the pipe 28, but the outlet of the fluid from the cylinder 3 is by way of the pipes 21, the valve housing 9, and the exhaust pipe 25. Thus, if the piston 2 is to drop slowly the outlet of the pressure fluid below the piston may be impeded by decreasing the size of the pipe through which the fluid below the piston escapes.

I am thus enabled to efficiently operate the power piston 2 which raises the load of fluid in the pump and then I am enabled to close off the entrance of pressure fluid to the cylinder 3 and allow the load to draw the piston back to its initial lower position. The control of the pressure fluid by the trip valve is simple and automatic as has been described and very little attention in the operation of the power installation will be necessary.

While I have noted the use of steam as the pressure liquid, it is obvious that other pressure fluids, such as air under pressure or liquids may be employed if desired. I do not wish therefore to be confined to the use of any particular type of pressure fluid.

What is claimed as new is:

1. In combination, a cylinder, a power piston operable therein to raise a load, a pressure fluid supply line connected with the lower end of said cylinder, an exhaust line connected with the upper end of said cylinder, a trip valve housing connected in said supply line, a multiple piston valve slidable in said housing, a fluid control enlargement on said valve normally clearing said supply line, a plurality of other enlargements on said valve, fluid conducting pipes from said cylinder to said housing to allow passage of pressure fluid between said cylinder and said housing one of said pipes conducting fluid above one of said other enlargements while the other is closed and the other of said pipes conducting fluid above the other enlargement when the first pipe is closed, thus acting to move said fluid control enlargement to close off the supply of pressure fluid to said cylinder when said piston reaches the upper end of its stroke and move said valve to open said pressure fluid line again when said piston reaches the lower end of its stroke.

2. In combination, a cylinder, a power piston operable therein to raise a load, a pressure fluid supply line connected with the lower end of said cylinder, an exhaust line connected with the upper end of said cylinder, a trip valve housing connected in said supply line, a multiple piston valve slidable in said housing, a fluid control enlargement on said valve normally clearing said supply line, a plurality of valve control enlargements on said valve, fluid conducting pipes from said cylinder to said housing adjacent said valve control enlargements, whereby said valve is moved by fluid under pressure from said cylinder to close off the supply of the pressure fluid past said fluid control enlargement at the upper end of the stroke of said power piston and open said supply line again at the lower end of the stroke of said power piston.

3. In combination, a cylinder, a power piston operable therein to raise a load, said piston falling by gravity a pressure fluid supply line connected with the lower end of said cylinder, an exhaust line connected with the upper end of said cylinder, a trip valve housing connected in said supply line, a multiple piston valve slidable in said housing, a fluid control enlargement on said valve normally clearing said supply line, a valve control head on the end of said valve away from said fluid control enlargement, a pipe connecting the upper end of said housing with said cylinder at a point spaced from the lower end of said cylinder, a second pipe connecting said cylinder and said valve housing at points spaced from their upper ends, said second pipe being arranged to supply pressure fluid above said control head to move said valve when said piston has reached the upper end of its stroke, said first mentioned pipe being open to conduct fluid from below said piston in said cylinder to said housing above said control head when said control valve has been moved downwardly and said piston is falling.

4. A power cylinder closed at both ends, a power piston therein arranged to raise a load, a pressure fluid conducting line connected with the lower end of said cylinder, an open exhaust line connected with the upper end of said cylinder, a trip valve housing connected in said pressure fluid line, a piston valve therein normally held by pressure fluid to clear the passage for pressure fluid to said cylinder, a control head on said valve above said piston valve, fluid conducting pipes connecting said valve housing adjacent its upper end with said cylinder at points spaced slightly from its ends, said pipes being arranged to admit pressure fluid above said control head when said piston has reached the upper end of its stroke to move said piston valve to close off the supply of pressure fluid to said cylinder, said pipes being closed from the supply of pressure fluid when said piston has reached the lower end of its stroke, the pressure fluid below said valve then acting to return said trip valve to open position.

5. A power cylinder, a power piston therein arranged to raise a load, an exhaust line connected with the upper end of said cylinder, a pressure fluid supply line connected at the lower end of said cylinder, a trip valve housing in said pressure fluid supply line, a trip valve therein, normally held in open position by the pressure fluid, a control head on said valve of larger area than said trip valve, connections between said cylinder and said housing to supply pressure fluid above said control head to close said valve when said piston has reached the upper end of its stroke, said connections being closed to pressure fluid by said power piston when said power piston reaches the lower end of its stroke.

6. A power cylinder, a power piston therein arranged to raise a load, an exhaust line connected with the upper end of said cylinder, a pressure fluid supply line connected at the lower end of said cylinder, a trip valve housing in said pressure fluid supply line, a trip valve therein, normally held in open position by the pressure fluid, a control head on said valve of larger area than said trip valve, an upper connecting pipe from said power cylinder to conduct fluid above said control head, to move said valve to close position, a lower connecting pipe from the upper end of said housing to a point adjacent the lower end of said cylinder, said upper connecting pipe being adapted to receive pressure fluid from said cylinder when the power piston reaches the upper end of said cylinder and thus moves said valve, the fluid compressed below said piston on its falling stroke acting to maintain said valve closed until said power piston has reached the lower end of said cylinder.

7. A power cylinder, a power piston therein arranged to raise a load, an exhaust line connected with the upper end of said cylinder, a pressure fluid supply line connected at the lower end of said cylinder, a trip valve housing in said pressure fluid supply line, a trip valve therein, normally held in open position by the pressure fluid, a control head on said valve of larger area than said trip valve, an upper pipe connecting the upper portion of said power cylinder with the upper end of said housing, said pipe being adapted to receive pressure fluid from below said piston when said piston has reached the upper end of its stroke, whereby said valve is moved to closed position, a lower pipe to conduct fluid from below said piston to the space above said control head when said piston is falling until said piston has reached the lower end of its stroke, said pipes being then open to said exhaust to allow said pressure fluid below said trip valve to move it to open position.

8. A closed power cylinder, a load lifting piston movable therein, a pressure fluid supply line connected with the lower end thereof, an exhaust line connected with the upper end thereof, a trip valve housing connected in said supply line, a trip valve in said housing, a pair of spaced enlargements thereon to control the passage of pressure fluid to said cylinder through said line, means to maintain said valve normally in open position, fluid conducting pipes connecting said housing to said cylinder to permit entrance of pressure fluid to the upper end of said valve to move said enlargements to close said supply line to said cylinder when said power piston has reached the upper end of its stroke, the fluid pressure below the falling piston then being exerted above said valve to keep it closed until the said power piston has reached the lower end of its stroke, said pipes then being open to said exhaust, said means then acting to open said valve.

9. A combination as recited in claim 8 in which the lower end of said valve housing is constantly open to said exhaust.

10. A closed power cylinder, a power piston therein, a load engaging rod on said piston, a pressure-fluid supply line connected with the lower end of said cylinder, an exhaust line from said cylinder, a trip valve housing connected in said pressure fluid supply line, a piston valve therein, a control head on said valve of larger diameter than said valve, and fluid-conducting pipes connecting said cylinder and said housing arranged to receive and conduct pressure fluid from said cylinder to said control head to move said head to close said valve when said power piston has moved to the upper end of said cylinder and to open said housing above said head to the exhaust line and close the entrance of pressure fluid to said control head and open said valve when said power piston has dropped to the lower end of said cylinder.

11. A closed power cylinder, a power piston therein, a load engaging rod on said piston, a pressure-fluid supply line connected with the lower end of said cylinder, an exhaust line from said cylinder, a trip valve housing connected in said pressure fluid supply line, a piston valve therein, a control head on said valve of larger diameter than said valve, and fluid-conducting pipes connecting said cylinder and said housing arranged to receive and conduct pressure fluid from said cylinder to said control head to move said head to close said valve when said power piston has moved to the upper end of said cylinder and to open said housing above said head to the exhaust when said power piston reaches the upper end of said cylinder, and means to move said valve to open position when said fluid exhausts above said control head.

12. A power cylinder, a power piston working therein to lift a load, a pressure fluid line to deliver pressure fluid to the lower end of said cylinder, a valve housing connected in said line, a stationary piston at one end of said housing, a movable valve piston telescoping over said stationary piston, an exhaust line at the upper end of said power cylinder, a vent from said valve housing to said exhaust line, pipes connecting said cylinder with said housing to conduct pressure fluid thereto when said piston has reached the upper end of its stroke and move said valve piston upon said stationary piston to close said valve and shut off the passage of pressure fluid to said cylinder.

13. A power cylinder, a power piston working therein to lift a load, a pressure fluid line to deliver pressure fluid to the lower end of said cylinder, a valve housing connected in said line, a stationary piston at one end of said housing, said line for pressure fluid extending axially of said stationary piston, a movable valve piston telescoping over said stationary piston, said valve piston having openings from said stationary piston to said housing, an exhaust line at the upper end of said power cylinder, a vent from said valve housing to said exhaust line, pipes connecting said cylinder with said housing to conduct pressure fluid thereto when said piston has reached the upper end of its stroke and move said valve piston upon said stationary piston to close said valve and shut off the passage of pressure fluid to said cylinder.

JOHN HELENBERG.